United States Patent [19]

Mang et al.

[11] 4,065,284

[45] Dec. 27, 1977

[54] METHOD OF TEMPERING GLASS SHEETS OF UNEQUAL THICKNESS

[75] Inventors: Raymond L. Mang; Thomas W. Carr, both of Huntsville, Ala.

[73] Assignee: PPG Industries, Inc., Pittsburgh, Pa.

[21] Appl. No.: 773,356

[22] Filed: Mar. 1, 1977

[51] Int. Cl.² .......................................... C03B 27/00
[52] U.S. Cl. ........................................ 65/114; 65/116
[58] Field of Search ............... 65/114, 116, 348, 349, 65/350

[56] References Cited

U.S. PATENT DOCUMENTS

| | | | |
|---|---|---|---|
| 2,198,622 | 4/1940 | Forbes | 65/114 |
| 3,762,905 | 10/1973 | Artama et al. | 65/348 X |
| 3,776,709 | 12/1973 | Melling et al. | 65/114 |

Primary Examiner—Arthur D. Kellogg
Attorney, Agent, or Firm—Dennis G. Millman

[57] ABSTRACT

Glass sheets of unequal thickness are tempered sequentially on one tempering line by employing a lightweight heating furnace within which each glass sheet may be brought up to a thermal condition suitable for tempering by a two-stage heating cycle which differs from one glass thickness to another. Also disclosed are means for temporarily adapting a conventional tempering line for carrying out such a process.

4 Claims, 2 Drawing Figures

METHOD OF TEMPERING GLASS SHEETS OF UNEQUAL THICKNESS

BACKGROUND OF THE INVENTION

This invention relates to a method and apparatus for thermally tempering glass sheets which are to be subsequently laminated. In particular, it relates to the problem of heating glass sheets of different thicknesses as part of a tempering process while maintaining their surface contours closely matched for subsequent lamination. The sheets are usually bent to their desired shapes in a separate operation prior to tempering.

The use of tempered or laminated glass is widespread in applications were strength and/or safety are of concern. In certain specialized applications, most typically for aircraft glazing, it is desired to fabricate a glass transparency that is both tempered and laminated. In such a case, it is necessary to temper the glass sheets individually and then laminate two or more together with a layer of plastic between each pair of adjacent glass surfaces. Because the thermal tempering process involves heating the glass sheets to a temperature at which slight changes in the shape of the glass can take place, great care must be taken to insure that a pair of glass sheets to be laminated are subjected to nearly identical temperature conditions during tempering so that the curvatures of their mating surfaces remain in close correspondence. Mismatched surfaces can lead to poor quality laminates. In addition, when curved glass sheets having mismatched surfaces are laminated together, lamination imparts to the mismatched portions stresses likely to cause delamination and even breakage of the laminated transparency during service.

It has now been proposed to laminate together tempered glass sheet of differing thicknesses. But glass sheets of different thicknesses will heat up at different rates under a given set of furnace operating conditions, and therefore their surface contours will tend to diverge from conformity with one another in the tempering process. It is generally not practical, when using conventional massive furnaces used in mass production operations, to alter furnace conditions from one piece to another because of the long time lag usually entailed in altering the furnace conditions. Nor has it been found acceptable to heat thick pieces and thin pieces in separate groups on the same furnace or two different furnaces because of the difficulty of duplicating thermal conditions in two separate furnace campaigns.

Lightweight furnaces have been employed for heating glass sheets in the prior art, such as in U.S. Pat. No. 3,697,243 to Artama and U.S. Pat. No. 3,762,905 to Artama et al., but how such furnaces might be deployed to solve the problem of tempering glass sheets of unequal thickness to be laminated has not been addressed heretofore.

Another substantial body of prior art discloses various glass heating methods involving two stages or more. U.S. Pat. Nos. 3,914,119 and 3,951,634 both disclose methods of reheating glass sheets after bending and prior to tempering, but all the sheets in a given series are of the same thickness and are treated in the same way. U.S. Pat. Nos. 2,198,622; 2,244,113; 3,223,499; 3,406,022; and 3,809,544 disclose various glass heat-treating processes in which the glass articles in each are subjected to different rates of heating at different stages of the process. None deals with the problem of tempering differing thicknesses of glass.

U.S. Pat. No. 3,827,872 discloses preheating selected areas of a glass sheet about to be heated and tempered.

SUMMARY OF THE INVENTION

It has now been discovered that glass sheets of unequal thickness may be thermally tempered with reduced curvature differences if each sheet is first preheated slowly throughout its thickness to a first temperature, and then heated rapidly to a higher temperature suitable for tempering, wherein the thicker sheets are preheated for a longer period of time than the thinner sheets. As soon as the temperature suitable for tempering is attained, each glass sheet is quickly quenched by cooling blasts of tempering fluid. In order to assure uniformity of curvature, pairs of glass sheets of unequal thickness are processed in close sequence on the same tempering line. To provide each thickness with the appropriate heat schedule, a furnace is utilized which is capable of quickly changing thermal conditions. The furnace is preferably a lightweight, electrically heated furnace of low heat capacity, because such a furnace exhibits little lag in changing from one temperature to another.

Another aspect of the invention involves the adaptation of a conventional tempering line to carry out the method of the present invention. The furnace in a conventional glass tempering line is most typically a heavy, permanently installed furnace having relatively thick walls of ceramic refractories, and is usually not capable of changing temperature rapidly enough to successfully carry out the method of the present invention. If the transition from the preheating temperature to the tempering temperature is accomplished too slowly, the glass sheets may tend to sag, and some sheets may sag more than others. Also, subsequently cooling the furnace back down to the preheating temperature in preparation for another cycle may consume an unduly large amount of production time.

Although an existing tempering line comprising a massive furnace designed for mass production purposes may not be suitable for carrying out the method of the present invention, it may be difficult to justify the construction of a new tempering line for making such a specialized product having a low volume of sales. Therefore, in accordance with the second aspect of the invention, a conventional tempering line is provided with an auxiliary, lightweight furnace at the unloading end of the line. The two-step heating is carried out in the auxiliary furnace, and the conveying and quenching equipment of the existing line utilized by conveying each heated sheet out of the furnace in the opposite direction from the usual operation of the tempering line.

THE DRAWINGS

DETAILED DESCRIPTION

Thermally tempering glass requires that the glass be heated to a temperature at which the glass begins to soften and expand (usually at a viscosity of about $10^{13.6}$ poises for ordinary soda-lime-silica glass) followed by sudden chilling and hardening the surface portions of the glass before the bulk of the glass can cool and contract. A wide variety of means for carrying out this sequence of heating and sudden chilling are known in the art. In carrying out the method of the present invention, two sheets of glass having unequal thicknesses are tempered in succession by first preheating one of said sheets at a relatively slow rate to a temperature slightly below that required for tempering and then rapidly heating the sheet to the temperature required for tempering, and quenching the heated sheet immediately. The process is then performed in a modified manner on the other sheet. It is a feature of this invention that the thicker of the pair of glass sheets is subjected to the preheating step for a longer period of time than the thinner sheet. Thus, the method of this invention may be practiced on any prior art tempering arrangement in which the temperature of the heating chamber can be quickly and easily changed. In its simplest form this would require a lightweight furnace, means to cool the heated glass, and means to convey the glass sheets through the heating and cooling zones. Instead of a lightweight furnace, a two-chamber furnace could be employed — one chamber at a lower temperature for preheating, and another chamber at a higher temperature for raising the glass temperature to that required for tempering. However, the preferred embodiment is that which utilizes the conveying and cooling means of an existing conventional tempering line, and it is in connection with such an embodiment that the invention will be described in detail.

Figure 1:
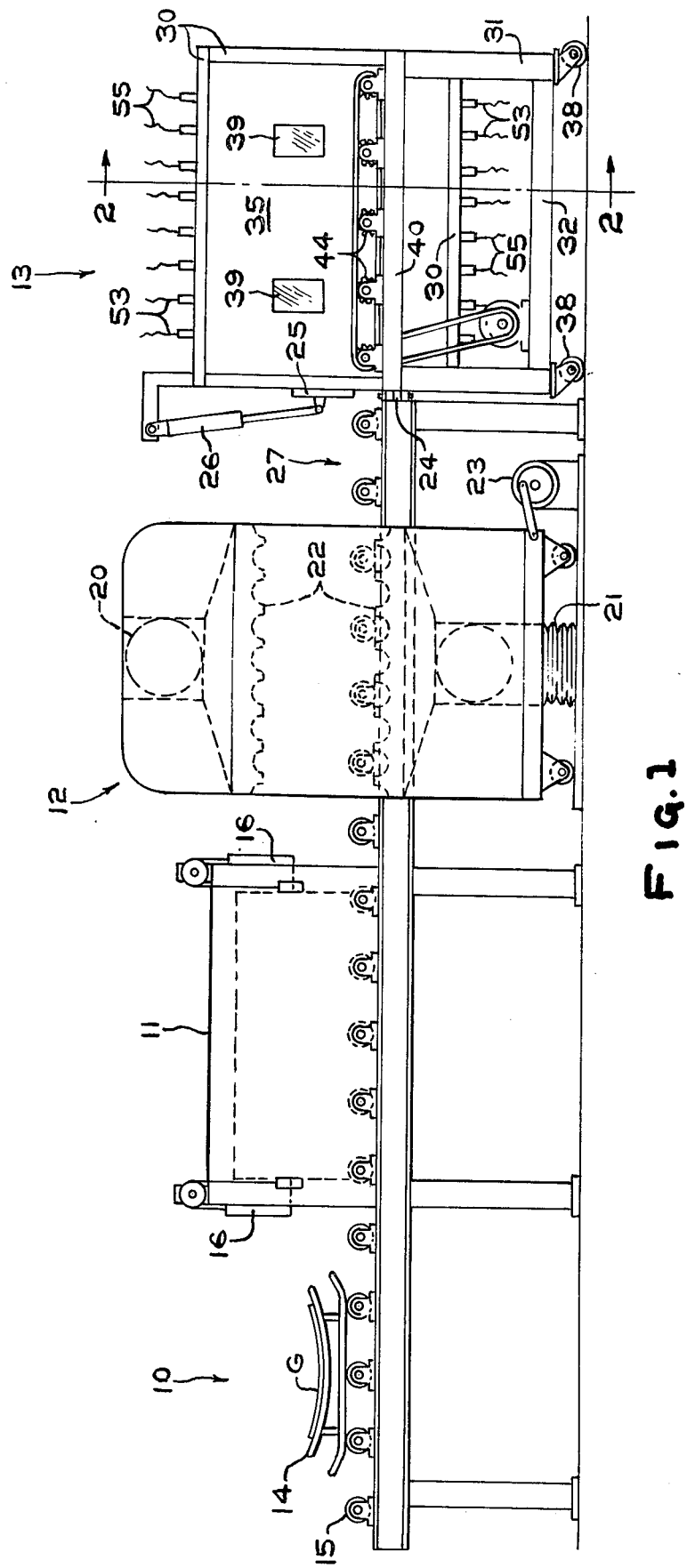
FIG. 1 is a schematic elevational side view of a glass sheet tempering line including an auxiliary furnace in accordance with a preferred embodiment of the invention.

Referring to FIG. 1, a conventional tempering line may include a glass loading zone 10, a relatively heavy ceramic furnace 11, and an air quench chamber 12. At what would previously have been the unloading end of the line, a movable, lightweight auxiliary furnace 13 is added for the purposes of the present invention.

At the loading zone 10, a single sheet of glass G is placed onto a carriage 14. The glass sheet, usually bent in a separate preceding operation, is supported on the carriage at its marginal edges only by an outline ring support member. The carriage 14 and the glass sheet G are conveyed on a driven roll conveyor 15 through open doors 16 of furnace 11 (which is not heated), through quench chamber 12, and into the auxiliary furnace 13. Upon being subjected to two-stage heating in the auxiliary furnace, the direction of the conveyor is reversed, and the carriage 14 and glass G are conveyed back into the quenching chamber 12 where the glass sheet is rapidly cooled by blasts of air. After being quenched, the glass sheet is conveyed through furnace 11 to loading zone 10 where the glass is removed from the carriage and replaced by another sheet of glass to begin another cycle.

The quenching chamber 12 is supplied with air by upper and lower ducts 20 and 21, respectively. Air is directed onto both sides of a glass sheet by opposed upper and lower rows of slot nozzles 22. A motor 23 imparts reciprocating motion to the nozzles so as to improve the uniformity with which the quenching air is applied to the opposite major surfaces of the glass sheets.

The conventional conveyor system, furnace 11, and quenching chamber 12 in FIG. 1 are essentially the same as those shown in U.S. Pat. No. 3,762,902 to Wagner and Golightly, the disclosure of which is hereby incorporated by reference for additional details of those elements.

The auxiliary furnace 13 of the present invention is pivotably affixed to the existing apparatus beyond the quench chamber 12 by means of a hinge 24 to an intermediate conveyor section 27 so that the auxiliary furnace may be swung into an operative position of alignment shown in FIG. 1 for tempering glass sheets of unequal thickness in accordance with the present method. The auxiliary furnace 13 may also be moved into an inoperative position out of alignment with conveyor section 27 so that glass sheets may be unloaded from the end of conveyor section 27 when the tempering line is being operated in the conventional mode to produce tempered glass sheets on a mass production basis. Auxiliary furnace 13 is provided with a door 25 through which the glass-carrying carriage 14 enters and leaves. The door is automatically operated by a pneumatic cylinder 26.

Figure 2:
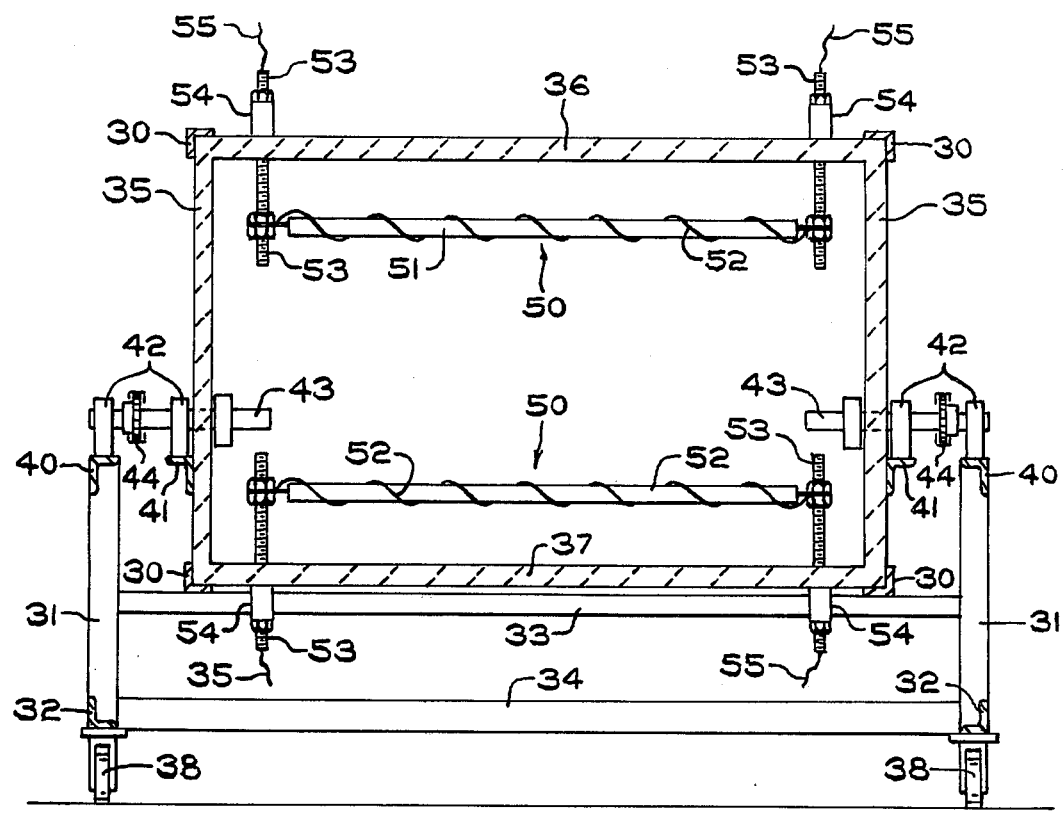
FIG. 2 is a cross-sectional view of the auxiliary furnace in FIG. 1 taken along line 2—2 of FIG. 1.

Referring now to FIG. 2 as well as FIG. 1, the construction of the auxiliary furnace may be seen to be based on a frame of angle irons 30 resting on a support structure formed by tubular legs 31 and cross-braces 32, 33 and 34. Side walls 35, roof 36, and bottom 37 from a furnace enclosure and are made of a lightweight insulating material which may be rigid, but not necessarily having great structural strength. An example of a suitable material is mineral fiber insulation board such as a product sold under the name "Kao-Block" by the Babcock-Wilcox Co. In practice, a thickness of 1 inch (2.54 centimeters) of "Kao-Block" has been found satisfactory for the furnace enclosure, with a 2 inch (5.08 centimeters) thickness on side walls 35 preferred in order to maintain the edges of the glass sheets slightly warmer than the unsupported center portions which are susceptible to sagging. Optionally the furnace may be reinforced with an outer sheath of sheet metal or metal mesh. The entire auxiliary furnace is carried on casters 38 so that it may be rolled into and out of position as it is pivoted about hinge 24. The sides of the furnace may include observation windows 39.

The auxiliary furnace is flanked by pairs of angle irons 40 and 41, each carrying a plurality of aligned pairs of bearings 42 in which are received a plurality of stub rolls 43 forming a conveyor for carriage 14 along the length of the auxiliary furnace. The stub rolls may be driven by a motor and chain drive mechanism (not shown) associated with sprockets 44 on each stub roll.

While combustion heating could be used, it is preferred that the auxiliary furnace be electrically heated since electric heat can be made more responsive to change the temperature within the auxiliary furnace 13. Also, by relying primarily on radiant heating from electric heaters, the heat can be directed advantageously to specific areas of the glass sheets. In the specific preferred embodiment shown in FIG. 2, a plurality of electric heaters 50 are provided along the top and bottom of the furnace enclosure. Optionally, additional heaters may be included along the side walls. Each heater 50 is based on an insulator tube 51 made of a ceramic material such as mullite. A resistance heating element 52 such as nichrome wire is wound onto the ceramic tube. A threaded stainless steel rod 53, inserted through the furnace roof or bottom, supports each end of each heater and provides electrical connection between the heater wire 52 and external electrical leads 55. A sleeve 54 holds each threaded rod 53 in place.

The number and power output of the heaters 50 will depend upon the particular needs of each specific application. In one case, each heater 50 has a power output of 2 kilowatts, and the furnace included 36 such heaters on the top and another 36 heaters on the bottom. Each heater in that case was about 60 inches (152 centimeters) long and the heaters were spaced along approximately a 90 inch (228 centimeter) long zone of the furnace. With curved glass sheets, the heaters may be vertically adjusted so as to approximately follow the contour of the glass at a fixed distance therefrom. The heaters may be conveniently controlled by associating each with a separate variable off-on sequence timer. The heat output and the temperature profile in the furnace may then be controlled by setting the relative "on" time for each separate heater.

The precise operating temperatures in the auxiliary furnace will depend upon the size and thickness of the glass sheet being processed the degree of temper to be achieved, and other variables which differ from case to case. It is important that the glass be preheated at a temperature at which no significant misshaping of the glass occurs. This may usually entail a maximum preheating temperature about 100° F. (56° C.) below the tempering temperature. It is preferable to minimize the temperature change required between preheating and final heating, and therefore it is usually preferred that the minimum preheating temperature be no lower than about 300° F. (167° C.) below the tempering temperature in order to obtain the greatest benefit from the present invention. With a tempering temperature of 1150° F. (620° C.) in the glass, the optimum preheating ambient furnace temperature was found to be about 1000° F. (540° C.). The length of the preheating period is varied from piece to piece in accordance with the thickness of each piece. Preheating is continued until the temperature of the glass sheet is brought up to the ambient furnace temperature, and will require longer periods for thicker sheets. At the conclusion of the preheating stage, the heaters are turned on at their maximum rate of heating to quickly bring the temperature of the glass sheet up to the temperature suitable for tempering as rapidly as possible to minimize the amount of sag developed in each sheet.

EXAMPLE

A series of sheets of soda-lime-silica glass having alternate thicknesses of 3/16 inch (4.8 millimeters) and ¾ inch (19 millimeters) were tempered with an apparatus of the type shown in the drawings. A 3/16 inch (4.8 millimeters) sheet was preheated in the auxiliary furnace at 1000° F. (540° C.) for 10 minutes, then heated at the maximum rate of heating until its temperature reached 1150° F. (620° C.) and immediately removed from the furnace and quenched by air blasts. A ¾ inch (19 millimeters) sheet was immediately thereafter brought into the auxiliary furnace and preheated at 1000° F. (540° C.) for 20 minutes, then heated at the maximum rate of heating until its temperature reached 1150° F. (620° C.) and immediately removed from the furnace and quenched by air blasts. The pair of tempered sheets were found to have closely matched curvatures, and subsequently were successfully laminated together.

Other variations and modifications as are known to those of ordinary skill in the art may be resorted to without departing from the spirit and scope of the invention as defined by the appended claims.

We claim:

1. A method of tempering glass sheets of unequal thickness so as to maintain their surface contours in close correspondence with one another, comprising the steps of:

placing a relatively thin sheet of glass into a furnace which includes an array of heating means, within which the thin sheet is first subjected to a preheating temperature slightly lower than a temperature suitable for tempering so as to substantially avoid distorting the glass sheet surfaces for a period of time sufficient to heat the thin glass sheet throughout its thickness to approximately said preheating temperature, after which the thin sheet is subjected to a temperature within said furnace higher than said preheating temperature so as to rapidly heat surface portions of the thin sheet to a temperature suitable for tempering at which glass surface distortion may occur;

removing the thin sheet from the furnace and introducing it into a quenching zone wherein blasts of cooling tempering medium are directed onto the sheet so as to impart a temper thereto;

in close succession to the treatment of the thin sheet, placing a relatively thick sheet of glass into said furnace, within which the thick sheet is first subjected to said preheating temperature for a period of time sufficient to heat the thick sheet throughout its thickness to approximately said preheating temperature, after which the thick sheet is subjected to a temperature within said furnace higher than said preheating temperature so as to rapidly heat surface portions of the thick sheet to a temperature suitable for tempering at which glass surface distortion may occur;

removing the thick sheet from the furnace and introducing it into said quenching zone wherein blasts of cooling quenching medium are directed onto the sheet so as to impart a temper thereto;

whereby the glass sheets experience substantially identical distortion-producing conditions while being subjected to disparate heating schedules in accordance with their thicknesses, so that a thick sheet and a thin sheet tempered in close succession have their surface contours in sufficiently close correspondence with one another to permit them to be laminated together.

2. The method of claim 1 wherein the preheating temperature is about 100° F. (56° C.) to 300° F. (167° C.) below the tempering temperature.

3. The method of claim 1, wherein said sheets are curved and are supported at their marginal edge portions in a generally horizontal orientation.

4. The method of claim 1, further including a subsequent step of laminating said first sheet to said second sheet.

* * * * *